United States Patent

[11] 3,607,063

[72] Inventors  Frank C. Douglas
                Granby;
                Thomas K. Gregory, East Granby; Robert
                W. Stielau, Portland, all of, Conn.
[21] Appl. No.  865,119
[22] Filed      Oct. 9, 1969
[45] Patented   Sept. 21, 1971
[73] Assignee   United Aircraft Corporation
                East Hartford, Conn.

[54] MANUFACTURE OF CARBON FILAMENTS OF HIGH STRENGTH AND MODULUS
4 Claims, 1 Drawing Fig.

[52] U.S. Cl. ................................................. 23/209.3,
                          23/209.1, 219/10.61, 13/1
[51] Int. Cl. ......................................................... C01b 31/07
[50] Field of Search .......................................... 23/209.3,
         209.1; 219/10.61, 10.55; 13/7; 204/173; 264/25,
                                                          26, 29

[56]              References Cited
              UNITED STATES PATENTS
2,364,526   12/1944   Hansell ........................... 118/4

| | | | |
|---|---|---|---|
| 3,263,052 | 7/1966 | Jeppson et al. ............... | 219/10.55 |
| 3,313,597 | 4/1967 | Cranch et al. ................ | 23/209.3 |
| 3,327,086 | 6/1967 | Cable ........................... | 219/10.61 |
| 3,399,252 | 8/1968 | Hough et al. ................. | 23/209.3 X |
| 3,449,213 | 6/1969 | Knapp et al .................. | 201/19 |
| 3,457,385 | 7/1969 | Comming ...................... | 219/10.61 |
| 3,461,261 | 8/1969 | Lewis et al .................... | 219/10.55 |

OTHER REFERENCES
Cable " Induction and Dielectric Heating" copyright 1954, Reinhold Publishing Corp. pages 327– 340.

Primary Examiner—Edward J. Meros
Attorney—John D. Del Ponti

ABSTRACT: A method for continuously producing carbon strand of high tensile strength and modulus comprising passing carbonized filament through an electrically conductive enclosure, generating a current of radiofrequency in an oscillatory circuit connected to the enclosure and establishing an electric field axially oscillating at the radiofrequency within the enclosure of sufficient density to heat the carbon filament to graphitization temperature.

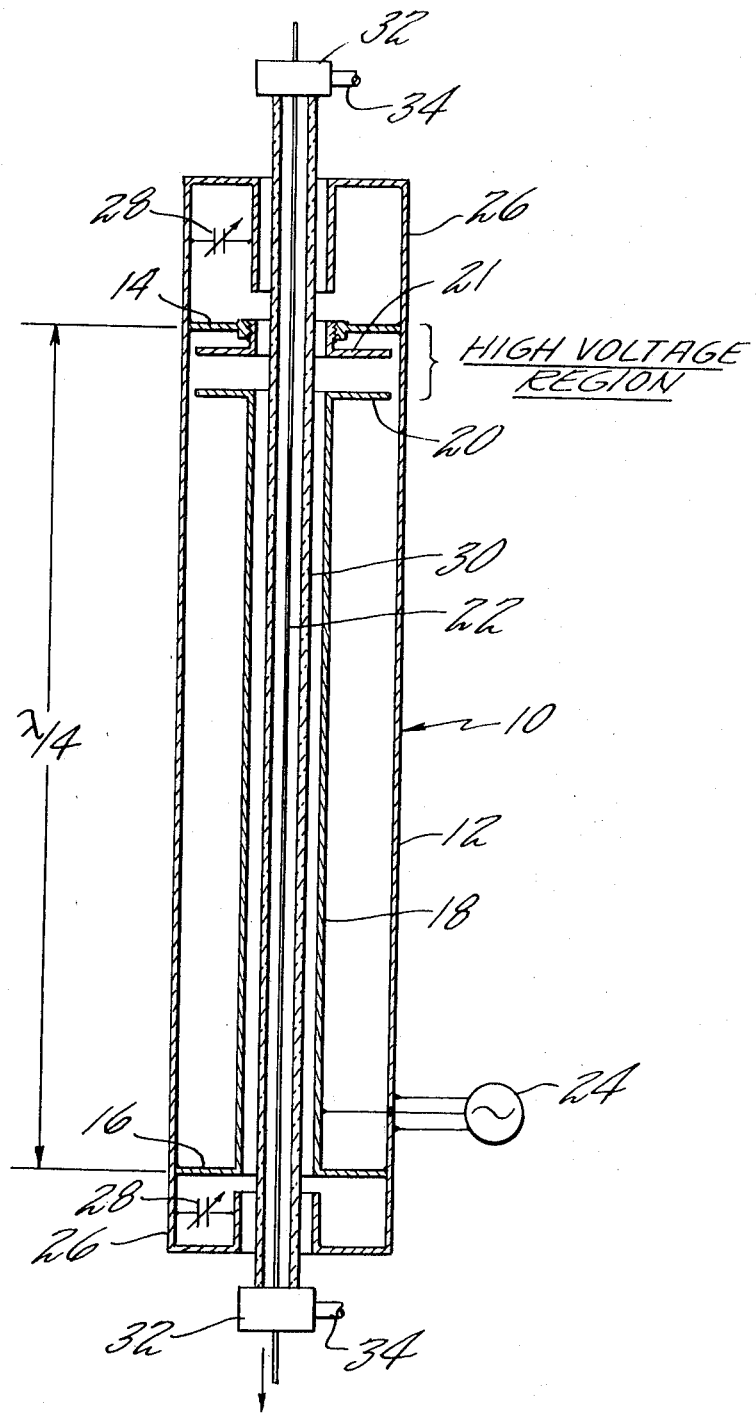

MANUFACTURE OF CARBON FILAMENTS OF HIGH STRENGTH AND MODULUS

BACKGROUND OF THE INVENTION

This invention relates to means for treating filamentary material and more particularly relates to means for continuously heating moving filamentary material by radiofrequency energy.

In recent years, considerable effort has been expended in the preparation of low-density, high-modulus fibers for use as reinforcement materials in lightweight composite structures. In particular, carbon filament or strand in the form of monofilaments or multiple continuous filaments or multiple fiber years has been found to offer significant potential for such usage. It is known however, that in order to provide a strand of acceptable properties including suitably high strength and modulus, the precursor material must be processed by heating to graphitization temperatures of from 2,500° to 3,500° C. Further, since carbon sublimes in such a temperature range, it is also necessary to attain and maintain such temperatures for a short span of time, typically no longer than 10 to 30 seconds. Because of the difficulty in meeting such carbon conversion requirements, prior art heating apparatus have been costly, cumbersome, and/or inefficient.

SUMMARY OF THE INVENTION

The present invention relates to means for producing quality filamentary carbon of high tensile strength and modulus.

In accordance with the present invention, carbonized or nearly carbonized precursor filaments such as carbonized organic polymers or commercially available carbonized cellulosic materials are heated immediately to graphitization temperatures of 2,500° to 3,500° C. by passing the filaments through a quarter-wave resonant cavity wherein an axially oscillating electric field of radiofrequency and high density has been established. In a preferred embodiment of the invention, a variable capacitor is provided as a part of the cavity in order to develop an electric potential gradient region of sufficient magnitude to heat the filaments to the desired graphitization temperature.

BRIEF DESCRIPTION OF THE DRAWING

An understanding of the invention will become more apparent to those skilled in the art by reference to the following detailed description when viewed in light of the drawing, which is an elevational view, in section, of apparatus employing a quarter-wavelength cavity coupler.

DESCRIPTION OF THE PREFERRED EMBODIMENTS

With reference to the drawing, the apparatus comprises a quarter-wave cavity coupler 10 having an outer tubular, electrically conductive enclosure 12 supporting, by upper and lower annular flange 14 and 16 respectively, an inner cylindrical inductor tube assembly 18. The inner tube assembly 18 is electrically a quarter-wavelength long and is provided with a variable capacitor 20 which has a movable upper plate 21, the upper plate being threadably received by the flange 14. There are thus provided means to establish an electric potential gradient region of sufficient intensity to heat carbonized or nearly carbonized precursor materials such as carbonized organic polymers or commercially available carbonized cellulosic materials into graphitization temperatures immediately. The material used is preformed and filamentary and may be composed of a plurality of staple-length fibers of one or more continuous or relatively long filaments. For purposes of illustration, a monofilament 22 is shown in the drawing as being representative of such material.

Power is fed in by a coaxial lead from a radiofrequency power source 24 capable of generating frequencies from 1 to 500 MHz. In order to prevent an end heating effect during operation, the outer ends of the cavity are provided with resonant energy traps 26 which are tunable by variable capacitors 28. As will be appreciated, the traps or resonators present a very low impedance, thus reflecting escaping energy back into the hot zone. and extending throughout its length is a glass or quartz chamber 30 fitted at both ends with appropriate closure means 32. The closure means 32 are provided with suitable gas inlets or outlets 34 and permit axial passage of the filament 22 through the chamber while retaining suitable fluid, such as an inert gas or liquid mercury or the like, to seal it from the atmosphere. During operation, the chamber 30 is filled with an inert gas, preferably nitrogen, in order to prevent oxidation. It should be noted that although filament traverse is depicted as being downward in the drawings, the direction of movement is not especially critical and upward movement will produce satisfactory results.

During investigations using apparatus as that shown in the drawing, a high field sufficient to heat carbonized filaments to graphitization temperature in the short but intense hot zone located in the high-voltage region between the plates of capacitor 20 was achieved. In one test, with the power available being limited to 1,000 watts, a carbon 100-end yarn was heated to 2,700° C. As will be appreciated during heat treatment it is preferred, in order to improve physical properties, to simultaneously tense the carbonized strand by forces which result in elongation up to 100 percent of its initial length.

While the present invention has been described with reference to particular materials, embodiments and operating techniques, it will be understood that these examples are illustrative only and that alternative materials, arrangements and operating conditions than those already mentioned will be evident to those skilled in the art. Accordingly, the true scope of the invention will be measured, not by the illustrative material, but rather in the spirit of the invention, by the appended claims.

What is claimed is:

1. A method for the continuous manufacture of carbon filaments of high strength and modulus comprising the steps of:
   continuously moving at least one carbon filament through an electrically conductive enclosure without making physical contact therewith;
   generating radiofrequency current in an oscillatory circuit connected to the enclosure, and establishing an electric field axially oscillating at said frequency within said enclosure of sufficient density to cause current flow in said carbon filament to heat the same to 2,500°–3,500° C.

2. In those processes for continuously manufacturing high-strength, high-modulus carbon filaments by heating pyrolyzed polymeric filaments to 2,000°–3,500° C. the improvement which comprises electromagnetically coupling the filaments to radiofrequency source means by passing said filaments axially through a cavity coupler to expose said filaments to an axial oscillating electric field having a density sufficiently high to cause current flow in the filaments to effect said heating.

3. The invention of claim 2 wherein said cavity coupler is a quarter-wave cavity coupler.

4. A method for the continuous manufacture of high-strength, high-modulus carbon filaments comprising moving preformed pyrolyzed polymeric filaments axially through a quarter-wave cavity and a capacitor located within the cavity and establishing a radiofrequency electric field within said cavity with a peak density between the plates of the capacitor of sufficient intensity whereby current is caused to flow in said filaments to heat the same to graphitization temperature.